United States Patent

Drennen et al.

(10) Patent No.: US 9,140,321 B2
(45) Date of Patent: Sep. 22, 2015

(54) INTERNAL PARK BRAKE SYSTEM, APPARATUS, AND METHOD

(71) Applicant: Goodrich Corporation, Charlotte, NC (US)

(72) Inventors: David Drennen, Bellbrook, OH (US); Robert French, Beavercreek, OH (US); Harald Klode, Centerville, OH (US); Kevin Rehfus, Troy, OH (US)

(73) Assignee: GOODRICH CORPORATION, Charlotte, NC (US)

(*) Notice: Subject to any disclaimer, the term of this patent is extended or adjusted under 35 U.S.C. 154(b) by 99 days.

(21) Appl. No.: 13/930,391

(22) Filed: Jun. 28, 2013

(65) Prior Publication Data

US 2015/0001034 A1    Jan. 1, 2015

(51) Int. Cl.
*F16D 65/14* (2006.01)
*F16D 63/00* (2006.01)
*B60T 13/74* (2006.01)
*B64C 25/44* (2006.01)
*F16D 121/24* (2012.01)

(52) U.S. Cl.
CPC ............. *F16D 63/006* (2013.01); *B60T 13/741* (2013.01); *B64C 25/44* (2013.01); *F16D 65/14* (2013.01); *F16D 2121/24* (2013.01)

(58) Field of Classification Search
None
See application file for complete search history.

(56) References Cited

U.S. PATENT DOCUMENTS

| | | | |
|---|---|---|---|
| 5,024,299 | A | 6/1991 | Shaw et al. |
| 6,561,321 | B1 | 5/2003 | Klode et al. |
| 6,983,829 | B2* | 1/2006 | Drennen et al. |
| 2013/0302221 | A1* | 11/2013 | Chen |

FOREIGN PATENT DOCUMENTS

EP    0520525    12/1992

OTHER PUBLICATIONS

Extended European Search Report dated Jan. 20, 2015 in European Application No. 14166236.1.

\* cited by examiner

*Primary Examiner* — Rodney H Bonck
(74) *Attorney, Agent, or Firm* — Snell & Wilmer L.L.P.

(57) ABSTRACT

A park brake system for an electric motor actuator is provided. The system may comprise a micro-motor, and one or more gears. The system may be configured to exert a radial force on a shaft of the electric motor actuator to lock the actuator. Moreover, in various embodiments, the system may be bi-stable.

9 Claims, 7 Drawing Sheets

INTERNAL PARK BRAKE SYSTEM, APPARATUS, AND METHOD

FIELD

The present disclosure relates to braking systems and, more specifically, to a stable (e.g., mono-stable and/or bi-stable) park brake for use with an electro-mechanical braking system.

BACKGROUND

Typical park brakes or friction brakes consist of a friction disc, which is clamped via a spring between the brake housing and a steel armature plate. The armature plate can be manipulated by providing an electrical current pulse to an electromagnet and permanent magnet assembly in order to either attract and hold the armature plate away from the friction disc (free state), or, after reversal of the current pulse, release the armature plate and clamp the friction disc (locked state). These systems may be susceptible to wear, vibration and/or contamination that could contaminate the internal structures of the electric motor actuator.

SUMMARY

In various embodiments, a park brake may comprise a micro-motor, a first gear, and a second gear. The micro-motor may comprise a gear train. The first gear may be coupled to the micro-motor. The second gear may be coupled to a shaft. The first gear may be configured to operatively engage the second gear, such that the shaft may bind and/or wedge in response to the motor being energized.

In various embodiments, an electric motor actuator may comprise an electric motor, a shaft, a sector gear, a micro motor, and a pinion gear. The shaft may be coupled to the electric motor. The sector gear may be coupled to the shaft. The pinion gear may be coupled to the micro-motor. The pinion gear may be configured to operatively engage the sector gear.

In various embodiments, an electric motor actuator may comprise a shaft, a shaft support, a first gear, a second gear, and a micro-motor. The shaft may be installed within the shaft support. The first gear may be installed on the shaft. The second gear may be configured to operatively engage the first gear. The motor may be configured to drive the second gear, such that, in response to the motor being energized, the second gear may drive the first gear causing the shaft to bind with the shaft support.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, phrases such as "make contact with," "coupled to," "touch," "interface with" and "engage" may be used interchangeably. Different cross-hatching may be used throughout the figures to denote different parts, but not necessarily to denote the same or different materials.

In various embodiments, a brake system may comprise an electric motor actuator ("EMA"). The EMA may be coupled to or otherwise operate a pressure generating device such as, for example, a ball screw, a ram, and/or the like. In operation, the EMA may cause the pressure generating device to move and/or exert a force on other brake system structures such as, for example, a brake disk or pad to exert a stopping force on as wheel or other suitable moving structure. The brake system may also include a park brake feature.

The park brake feature may be used to reduce the load on the EMA when the brake is engaged (e.g., in an idle configuration while waiting for take-off). The park brake feature may also provide brake locking capability, when power is not available to maintain power to the EMA (e.g., in a parked configuration).

Figure 1:
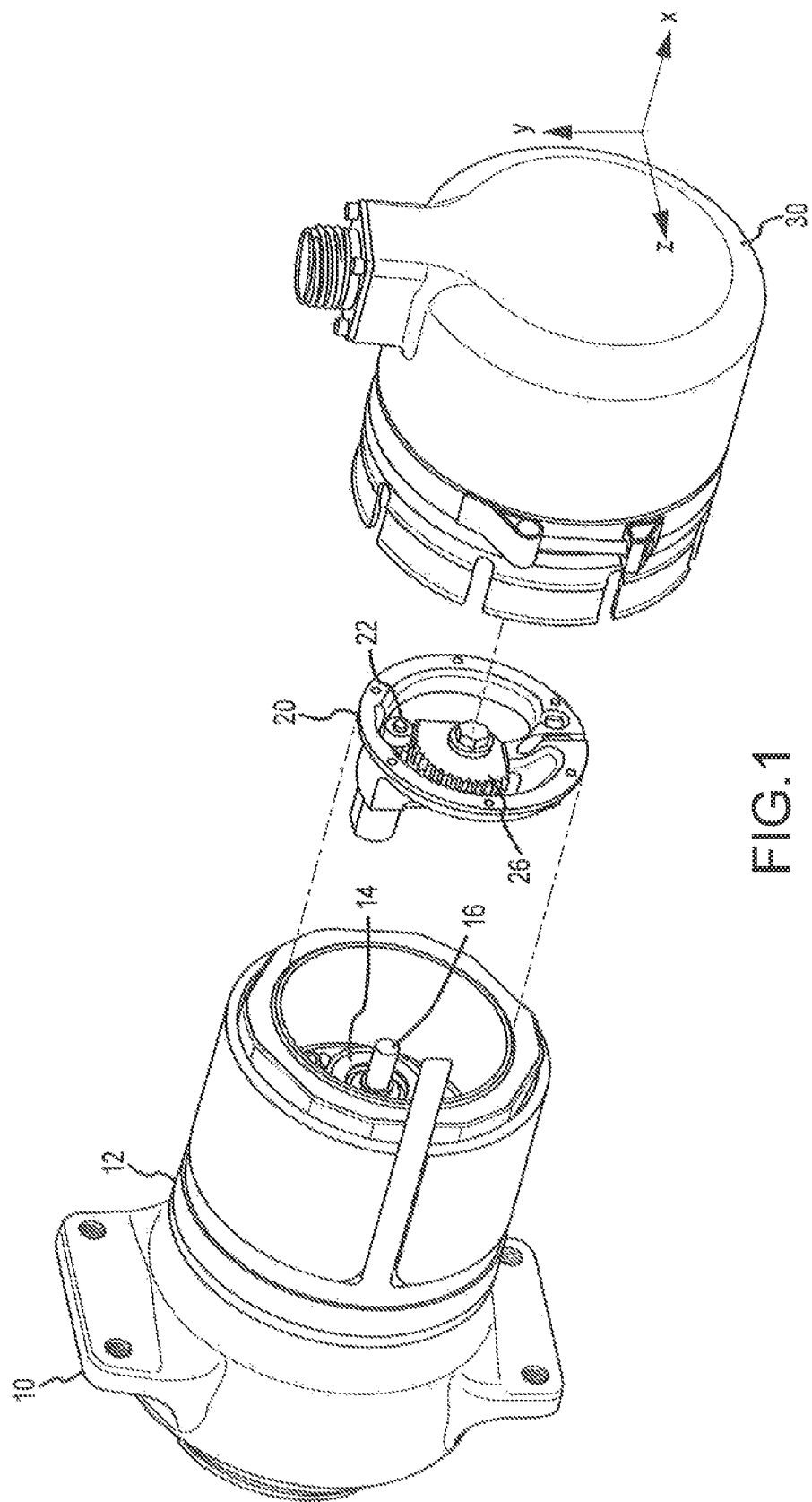
FIG. 1 illustrates an exploded perspective view of an electric motor actuator in accordance with various embodiments.

In various embodiments, and with reference to FIG. 1, EMA 10 may comprise a housing 12 and a cover 30. A three dimensional x, y and z axes is shown for reference and to aid in description. Cover 30 may be configured to sleeve over and/or couple to housing 12. EMA 10 may further comprise a park brake assembly 20 that is installable within housing 12. EMA 10 may also comprise a motor 14 and a shaft 16. Park brake assembly 20 may comprise a pinion gear 22 and a sector gear 26. Park brake assembly 20 may couple to or install on shaft 16. More specifically, sector gear 26 of park brake assembly 20 may operatively couple to or otherwise attach to sector gear 26.

In various embodiments, FIGS. 2A-2D show various cross sectional views of a portion of an EMA 10, where the x and y axes are shown for reference. Shaft 16 may be coupled to and/or combined with an electric motor 14. Electric motor 14 may turn and/or drive shaft 16. Shaft 16 may be coupled to or be integrally formed with a ball screw and/or other suitable ram. In this regard, shaft 16 is configured to translate the rotational motion of electric motor 14 to linear motion through the ball screw to create pressure on a stopping mechanism (e.g., a brake pad, pressure plate, wheel hub, and/or the like).

Figure 2A:
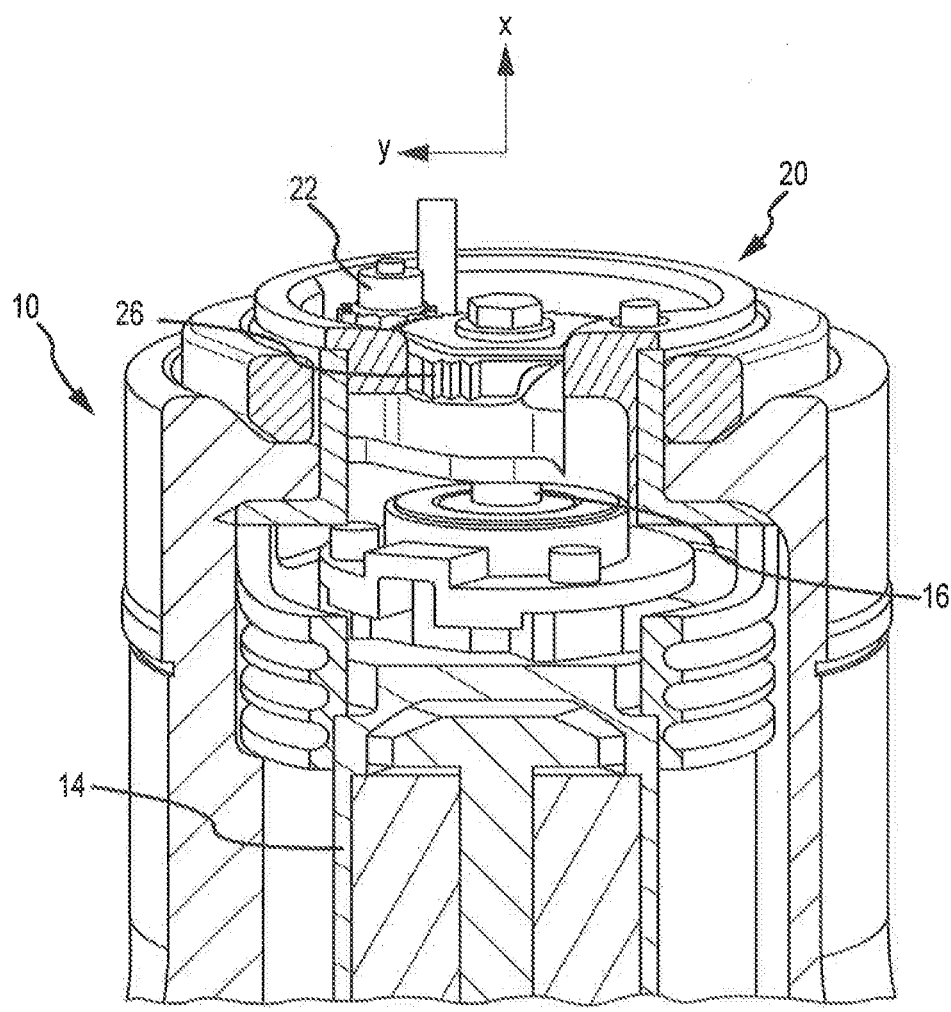
FIG. 2A illustrates a first cross-sectional view of a portion of an electric motor actuator in accordance with various embodiments.
Figure 2B:
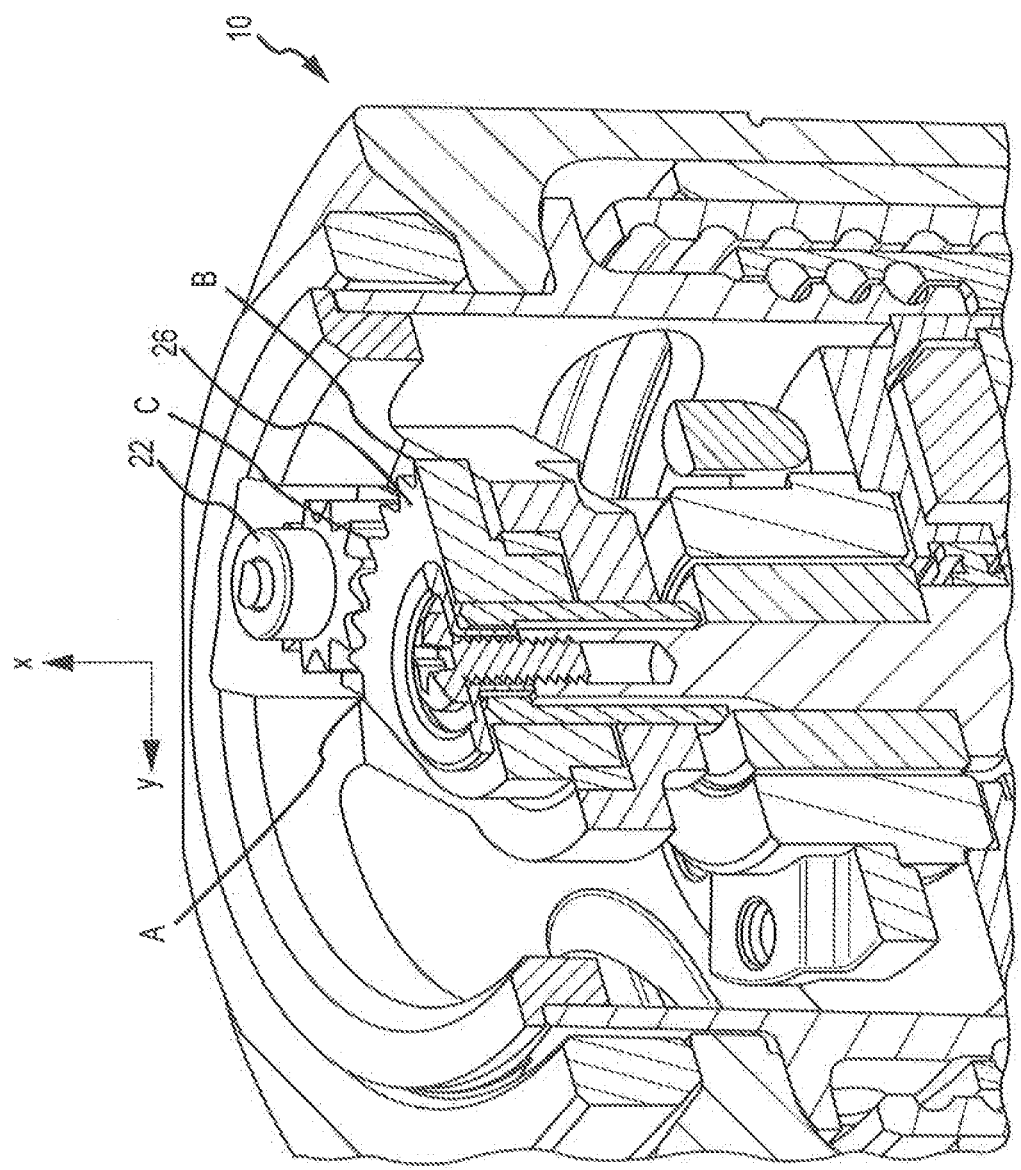
FIG. 2B illustrates a second cross-sectional view of a portion of an electric motor actuator in accordance with various embodiments.
Figure 2C:
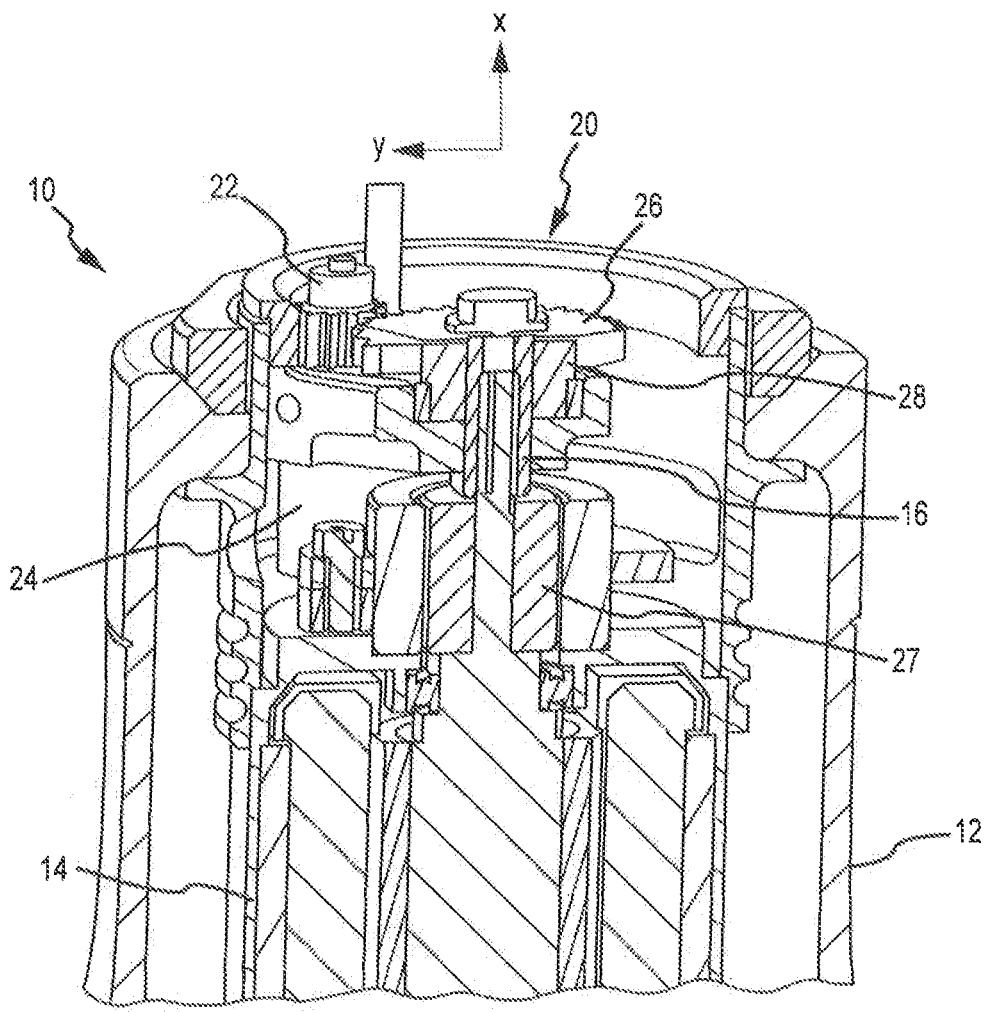
FIG. 2C illustrates a third cross-sectional view of a portion of an electric motor actuator in accordance with various embodiments.
Figure 2D:
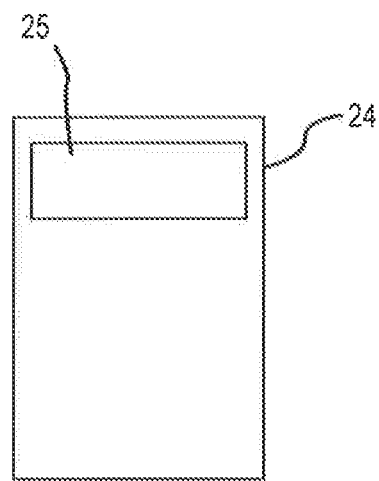
FIG. 2D is a block diagram that illustrates components of an exemplary micro-motor in accordance with various embodiments.

In various embodiments, pinion gear 22 may be configured to engage and/or operatively couple to sector gear 26, as shown in FIG. 2B. Pinion gear 22 may also be configured to drive sector gear 26 under pre-determined or dynamically determined operating conditions. Pinion gear 22 may be coupled to a micro-motor 24, as shown in FIG. 2C.

Motor 24 may be any suitable motor including, for example, a micro-motor. Motor 24 may provide a high mechanical advantage in a relatively small package to fit with a small envelope package of EMA 10. Motor 24 may comprise a gear train 25 (e.g., a micro-gear train within the housing of motor 24), and shown in FIG. 2D. Gear train 25 may have a gear ratio of approximately 35:1 to 90:1. The gear train of micro-motor motor 24 may also engage or be coupled to pinion gear 22. Pinion gear 22 provides an additional gear ratio of approximately 2:1 to 5:1 with respect to sector gear 26.

In various embodiments, sector gear 26 may be any suitable eccentric gear. In this regard, sector gear 26 may have a variable radius. In this regard, sector gear 26 is eccentric to the centerline of the shaft 16 (e.g., axis X). More specifically and with particular reference to FIG. 2B, sector gear 26 may be a portion of a gear wheel (e.g., a gear having a pie shape) having a first end A and a second end B. Moreover, the profile defined by the portion of the gear wheel may be non-uniform (e.g., having a first radius associated with first end A and a second radius associated with second end B, where the first radius is shorter than the second radius). In this regard, a profile C of the gear may be non-uniform and/or have a curvature that is a portion of an ellipse, but that would not be a portion of a circle. Moreover, sector gear 26 may comprise teeth over the portion of the non-uniform profile between the first end and the second end.

In various embodiments, EMA 10 may be locked under certain aircraft operating conditions (e.g., pre-determined operating conditions and/or dynamically determined operating conditions). In response to a command or condition to lock EMA 10, park brake assembly 20 may be engaged. For example, motor 24 may drive pinion gear 22 causing sector gear 26 to rotate along its non-uniform profile. The eccentric shape of sector gear 26 may act like a cam that creates a bind on the shaft 16. In this regard, as pinion gear 22 rotates the sector gear 26 between the first radius and the second radius, the body of sector gear 26 exerts a radial force (e.g., a three perpendicular to the X-axis) on shaft 16. This may cause shaft 16 to push into and/or bind on an internal structure of EMA 10 such as, for example, a shaft support 27 and/or an eccentric bushing 28.

Figure 3:
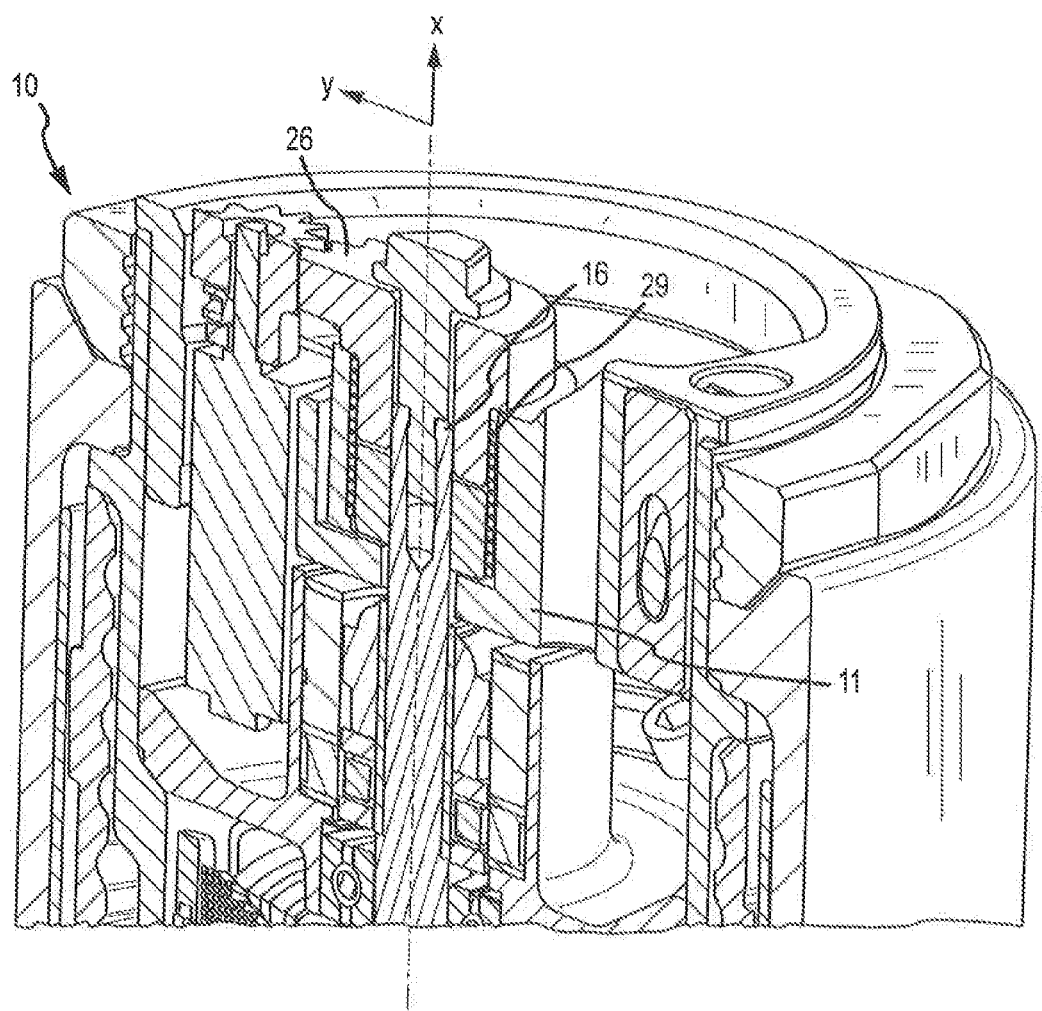
FIG. 3 illustrates a cross-sectional view of a portion of an electric motor actuator comprising a wrap spring in accordance with various embodiments.

In various embodiments and with reference to FIG. 3, EMA 10 may comprise a wrap spring 29. In this regard, EMA 10 and, more specifically shaft 16, may be locked by wrap spring 29. For example, wrap spring 29 may be installable over shaft 16 (e.g., wrap spring 29 defines a channel that shaft 16 may install through. Further, a first end of wrap spring 29 may be coupled to a stationary structure or EMA 10 (e.g., a portion of a housing 11). A second end of wrap spring 29 may be coupled to and/or engage sector gear 26. In this regard, as sector gear 26 rotates to lock EMA 10, wrap spring 29 would tighten on shaft 16, causing shaft 16 to bind.

In various embodiments, spring 29 may be fabricated from any suitable material such as, for example, round or square spring wire or be machined from solid bar stock, or molded from plastic material. The material of spring 29 may be chosen to achieve corrosion resistance (e.g., stainless steel) and sustain its properties over a broad temperature range, such as, for example, temperature from approximately −65° F. to approximately 350° F. In various embodiments, the gear ratio of park brake assembly 20 (e.g., the gear ratio associated with the gear train of motor 24 and pinion gear 22 relative to sector gear 26) may minimize the ability of EMA 10 and, more specifically, electric motor 14 to back-drive sector gear 26, under normal operation conditions. In this regard, park brake assembly 20 may lock EMA 10. The use of high gear ratios described above tend to create high levels of reflected inertia, which in turn reduces the ability of electric motor 14 to back drive sector gear 26.

In various embodiments, motor 24 may be bi-directional. Motor 24 may also have infinite rotation capability in both directions (e.g., clockwise and counter clockwise rotation), unlike solenoid based devices that have limited translations. The infinite rotation may allow for increased clamping adjustment as park brake assembly 20 components and/or other components wear (e.g., pinion gear 22, sector gear 26, eccentric bushing 28, pressure plates, brake pads, and/or other suitable components).

In various embodiments, contact force on shaft 16 may be increased with additional rotation, because park brake assembly 20 and, more specifically, pinion gear 22 and motor 24 have unlimited degrees of freedom in the rotary direction. The demand for increase friction force may be due to vibration, friction coefficient reductions, or component wear.

In various embodiments, pinion gear 22, motor 24 and sector gear 26 may prevent shaft movement in the applied or released condition creating a desired bi-stable condition. For example, in response to an input to lock EMA 10, motor 24 may be energized and cause pinion gear 22 and sector gear 26 to rotate to bind shaft 16, in response to the bind condition, motor 24 may be de-energized and still maintain EMA 10 in a locked condition. This is possible due to gear ratio provided by the system. Moreover, as a safety feature, EMA 10 and, more specifically, electric motor 14 has the capability to overcome a locked condition, because the output of EMA 10 at above normal operating conditions is able to overcome the reflected inertia associated with the gear ratio associated with park brake assembly 20.

In various embodiments, park brake assembly 20 may be controlled by or in electronic communication with a suitable control unit. The control unit may be capable of monitoring brake and/or EMA 10 operation. The control unit may further comprise logic that is configured to reduce the load on EMA 10 during operation. For example, the control unit may be configured to monitor a time associated with a load on EMA 10. In response to an electrical load exceeding a pre-determined threshold (e.g., 20 seconds) the control unit may activate or engage park brake assembly 20 to lock EMA 10 and minimize the electrical load on EMA 10. This condition may occur during taxi, as the aircraft is preparing to take off, or as the aircraft is moving about the airport (e.g., moving to a gate to boarding or deplaning, moving to a maintenance area, and/or the like).

Figure 4:
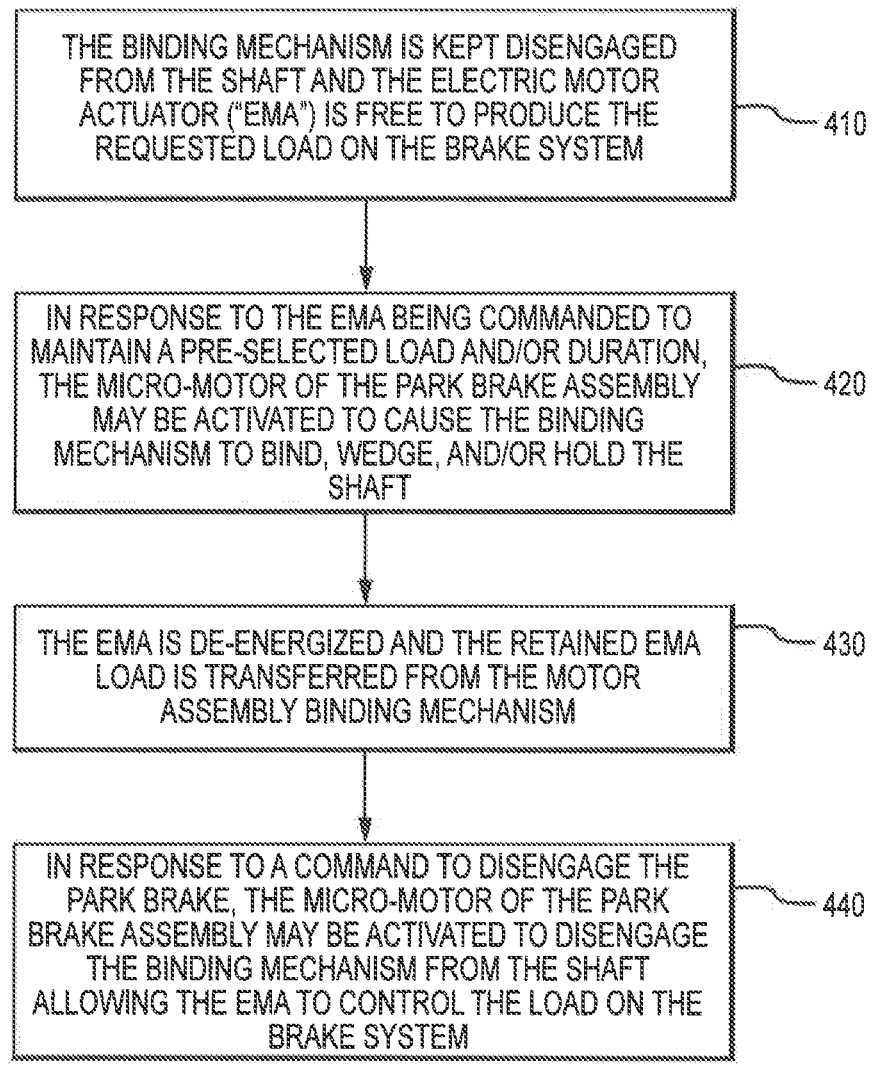
FIG. 4 is a block diagram that illustrates a method of operating an electric motor actuator in accordance with various embodiments.

In various embodiments and with reference to FIG. 4, the control unit may be configured to monitor and control EMA 10. For example, a binding mechanism (e.g., park brake assembly 20) may be kept disengaged from the shaft and the EMA may produce the requested load on the brake system (Step 410). In response to the EMA being commanded to maintain a pre-selected load and/or duration, the micro-motor of the park brake assembly may be activated to cause the binding mechanism to bind, wedge, and/or hold the shaft (Step 420). In this regard, the control unit may be configured to monitor the load on the EMA and engage the park brake assembly in response to the load exceeding a predetermined threshold. By reducing the load with the activation of the park brake assembly, the operational stress of associated with EMA operation (e.g., heat) may be reduced on various EMA components (e.g., the EMA motor, EMA gears, and/or the like). The EMA may be de-energized and the retained EMA load may be transferred from the motor assembly to the binding mechanism (Step 430). By transferring the load, the binding mechanism, and more specifically, the gear train of the park brake assembly carry the load required to hold the position of the EMA. In response to a command to disengage the park brake, the micro-motor of the park brake assembly may be activated to disengage the binding mechanism from the shaft allowing the EMA to control the load on the brake system (Step 440).

In various embodiments, park brake assembly 20 may be engaged to hold a vehicle (e.g., an aircraft in a stationary position when the aircraft is at rest (e.g., during overnight storage). Park brake assembly 20 may be engaged to hold a vehicle stationary during a start, warm-up, inspection or service. Park brake assembly 20 may also be engaged during flight in an aircraft application to avoid vibrational wear to EMA 10 and/or other brake system components.

The park brake assemblies described herein provide a cost effective, reliable, bi-stable locking system for electric motor actuators. Park brake assembly 20 may provide overall cost savings as compared to typical park brake systems. Moreover, the park brake assembly 20 may occupy substantially the same size envelope and mass of typical park brake systems.

In various embodiments, while the park brake assemblies described herein have been described in the context of aircraft applications, one will appreciate in light of the present disclosure, that the park brake assemblies described herein may be used on various other items that use as park brake including vehicles such as, for example, trains. Moreover, the park brake assemblies described herein may be employed with any suitable electric motor actuator in any installation to create a bi-stable locked condition.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An electric motor actuator, comprising:
   an electric motor;
   a shaft coupled to the electric motor;
   a wrap spring installable on the shaft;
   a sector gear coupled to the shaft;
   a micro-motor;
   a pinion gear coupled to the micro-motor, the pinion gear configured to operatively engage the sector gear.

2. The electric motor actuator of claim 1, wherein the sector gear comprises a non-uniform profile.

3. The electric motor actuator of claim 2, wherein the sector gear is configured to exert a force on the shaft in response to the micro-motor being energized.

4. The electric motor actuator of claim 1, wherein the shaft is engaged by the wrap spring in response to the micro-motor being energized.

5. The electric motor actuator of claim 1, wherein the micro-motor comprises a gear train.

6. The electric motor actuator of claim 5, wherein the gear train operatively couples to the pinion gear.

7. An electric motor actuator, comprising:
   a shaft configured to be driven by an electric motor;
   a shaft support, the shaft being installed within the shaft support;
   a second gear installed on the shaft, wherein the second gear is a sector gear that is a cam and is configured to exert a radial force on the shaft;
   a first gear configured to operatively engage the second gear;

a micro-motor configured to drive the first gear, wherein in response to the micro-motor being energized, the first gear drives the second gear causing the shaft to bind with the shaft support.

8. The electric motor actuator of claim 7, wherein the first gear is a pinion gear.

9. The electric motor actuator of claim 7, wherein the micro-motor comprises a gear train and the gear train is operatively coupled to the first gear, and wherein a gear ratio associated with the gear train and the first gear is approximately 90:1 to 450:1.

* * * * *